(12) United States Patent
Karasek et al.

(10) Patent No.: US 8,499,884 B2
(45) Date of Patent: Aug. 6, 2013

(54) RING-MOUNT JOINT

(75) Inventors: Jens Karasek, Kaufungen (DE); Ralf Schulz, Habichtswald (DE); Günther Schneider, Guxhagen-Ellenberg (DE)

(73) Assignee: Hübner GmbH, Kassel (DE)

( * ) Notice: Subject to any disclaimer, the term of this patent is extended or adjusted under 35 U.S.C. 154(b) by 159 days.

(21) Appl. No.: 13/183,855

(22) Filed: Jul. 15, 2011

(65) Prior Publication Data

US 2012/0018980 A1   Jan. 26, 2012

(30) Foreign Application Priority Data

Jul. 21, 2010 (EP) .................................. 10007551

(51) Int. Cl.
*B60T 7/12* (2006.01)
*B62D 53/06* (2006.01)
*B62D 53/08* (2006.01)

(52) U.S. Cl.
CPC .................................. *B62D 53/0878* (2013.01)
USPC .......................................... 180/403; 280/432

(58) Field of Classification Search
USPC ................... 180/403; 280/432; 403/120, 125, 403/164
See application file for complete search history.

(56) References Cited

U.S. PATENT DOCUMENTS

| 4,556,231 A * | 12/1985 | Schultz .......................... 280/432 |
| 2010/0025963 A1 * | 2/2010 | Staude ........................... 280/432 |
| 2010/0109278 A1 * | 5/2010 | Treude et al. ........... 280/137.502 |

FOREIGN PATENT DOCUMENTS

| DE | 29 29022 A1 | 1/1981 |
| DE | 3340446 A1 | 5/1985 |
| DE | 43 29674 A1 | 3/1995 |
| EP | 644105 A1 * | 3/1995 |
| EP | 0644105 A1 | 3/1995 |
| WO | 84/01135 A1 | 3/1984 |

OTHER PUBLICATIONS

EP 644105 A1, Kock, Robert, Mar. 1995, (Machine Translation).*

* cited by examiner

*Primary Examiner* — J. Allen Shriver, II
*Assistant Examiner* — Felicia L Brittman
(74) *Attorney, Agent, or Firm* — Gifford, Krass, Sprinkle, Anderson & Citkowski, P.C.

(57) ABSTRACT

A ring-mount joint between two vehicle units of an articulated bus, with the joint comprising two cantilevers, wherein each cantilever is arranged on one of the vehicle units, with each cantilever comprising a slewing ring, wherein the two slewing rings of the cantilever are mounted in each other so that they can be pivoted, wherein a damping device is provided for damping the rotational motion of the two cantilever relative to each other, wherein in the space enclosed by the inner slewing ring, there is arranged an annular chamber damper, wherein the annular chamber damper comprises two inter-mounted housing parts that are rotatable relative to each other, wherein the one housing part is in connection with the one cantilever and the other housing part is in connection with the other cantilever.

14 Claims, 5 Drawing Sheets

RING-MOUNT JOINT

CROSS-REFERENCE TO RELATED APPLICATIONS

This application claims priority of European Patent Application EP 10 007 551.4-1268 filed Jul. 21, 2010.

FIELD OF THE INVENTION

The invention relates to a ring-mount joint between two vehicle units, such as an articulated bus, with the joint comprising two cantilevers, wherein each cantilever is arranged on one vehicle unit, each cantilever having slewing ring, wherein the two slewing rings are rotatably interlocked with each, whereby a damping device is provided to dampen the rotational motion of the two cantilevers in relation to each other.

BACKGROUND OF THE INVENTION

Ring-mount joints of the initially mentioned type are used in particular in articulated buses; they are characterized by the fact that a joint is provided that allows an articulated motion, as it occurs when such a vehicle is negotiating a curve. In addition, such joints must tolerate pitching and rolling motions and/or superimposed types of motion such as pitching, rolling and articulated motions. In particular for receiving the pitching motions, there is a known solution consisting in providing rubber-to-metal bearing in the area of the connection of one cantilever to one vehicle unit, whose axis is perpendicular to the longitudinal axis of the vehicle.

A ring-mount joint, which is known from DE 43 29 674 B4, comprises two cantilevers, with each cantilever having a slewing ring, wherein the two slowing rings are in connection with each other via a ball bearing. One slewing ring has on its outer side an external toothing, which meshes with a corresponding rack, which is a component of a damping device that is arranged so that it faces the slewing ring. This damping device, which is well-known from this reference literature, is extremely complicated in construction and thus makes the joint expensive. Furthermore, another known solution is the damping of the ring-mount joint by at least one piston-cylinder device, whereby the piston-cylinder device is supported at its one end by one cantilever and, at its other end, by the other cantilever. With the damping devices of the type described above, it is possible not only to dampen the rotational motions of the two cantilevers relative to each other, but also to control the rotational motion, for example by stiffening the joint.

SUMMARY OF THE INVENTION

Based on the above-described prior art, the invention is to provide a ring-joint mount of the above-mentioned type that, on the one hand, takes up an overall smaller installed space and, on the other hand, is easy to maintain.

To achieve this technical goal, the invention proposes that in the space enclosed by the interior slewing ring, there is arranged an annular chamber damper, with the annular chamber damper having two inter-mounted housing parts that are rotatable relative to each, wherein the one housing part is connected to one cantilever and the other housing part is connected to the other cantilever. Hence, the following is clear: Whereas, based on a well-known ring-mount joint, in which—as has already been mentioned at the outset—there are provided state-of-the-art damping elements, for example in the form of piston-cylinder devices, which are attached to both sides of the joint, or are connected at the front to the one slewing ring by a rack gear, now according to the invention the damper is designed as an annular chamber damper and is built-in inside the space formed by the inner slewing ring, which, firstly, brings with it substantial saving in space and, secondly, if need be, allows to arrange the annular chamber damper between the two vehicle units regardless of the ring-mount connection.

The use of the so-called annular chamber dampers is already known from the prior art. In this context, reference is made to DE 33 40 446 A1, which shows such an annular chamber damper, although here the annular chamber damper as such is an integral part of the actual pivoting joint.

From EP 0 644 105 B1, a further embodiment of an annular chamber damper is known, in which the annular chamber damper is also an integral part of the actual pivoting joint. This means that on the one hand, the annular chamber damper and, on the other hand, the pivoting joint are provided in a one-piece embodiment. In contrast, in the inventive solution the annular chamber damper as such is arranged, as a separate component, in the space provided by the inner slewing ring, wherein only a connection of the two housing parts of the annular chamber damper with one or with the other cantilever is provided. An annular chamber damper is constructed of two housing parts. In particular, it can be provided here that the lower housing part, which is formed for example as a pot, is arranged on the first cantilever, while the rotor, which together with the pot forms the annular chamber damper, and which is mounted in the pot so that it is rotatable relatively to the pot, is connected to the other, second cantilever.

According to another feature of the invention, a cross-bar is provided to form the connection between the rotor and the other, second cantilever. It is clear that with a rotational motion of the two cantilevers relatively to each other, as it occurs, for example, when a bus negotiates a curve, the rotor of the annular chamber damper, as one housing part, rotates relative to the pot as a second housing part. That is, since the annular chamber damper is a separate component of the ring mount joint, it now requires a separate connection between the housing part of the annular chamber damper on the one hand, and the cantilever on the other hand, in order to ensure this relative motion, namely the aforementioned crossbar.

According to a particularly advantageous feature, the annular chamber damper is decoupled from the power flow between the front and the rear vehicle units. It has already been pointed out elsewhere that an articulated vehicle is exposed to a variety of travel motions. In addition to the previously mentioned articulated motion that occurs when such a vehicle is negotiating a curve, the joint must also tolerate rolling and pitching motions. If now the annular chamber damper is decoupled from the power flow between the front and the rear vehicle units, the annular chamber damper need not absorb the deformation forces corresponding to the driving motions of the consoles. The consequence of this is that the annular chamber damper can be sized differently than it would be the case, if such an annular chamber damper were not decoupled from the power flow. In this context, it is in particular provided that at least one housing part of the annular chamber damper is mounted so that it is elastically yielding in relation to the at least one cantilever. This means that at least the rotor and/or the pot of the annular ring damper is connected so that it is elastically compliant with the respective cantilever. If a ring-mount is subjected, for example, to a pitching motion as it occur when such a vehicle drives over a hill or a depression, then the distance between the vehicle on the two vehicle units shortens or extends on top and at the bottom causing the elastic deformation of the consoles. Due to the elastic mounting of at least one housing part of the annular chamber damper in relation to the corresponding cantilever, it is now ensured that in case of such motions of the vehicle units relative to each other, the thus caused elastic deformation of the cantilevers can be compensated.

In this context, it is specifically provided that the cross-bar is elastically mounted in the cantilever and/or in the rotor. In more detail, this can be done in that the cross-bar is provided at one end with studs, wherein at least one of the studs engages into a socket on the cantilever, where the socket has a lining made of elastically resilient material. In this context, however, it would also be conceivable to design the cross-bar to be telescopic, or even to arrange the pot of the annular chamber body as a part of the housing elastically yielding on the cantilever that retains the pot. In this context it is also essential that there is a certain distance between the wall of the pot as one part of the annular chamber damper and the inner slewing ring of the ring-mount joint so that the annular chamber damper does not come into lateral contact with the slewing ring.

In relation to the design of the annular chamber damper, it has already been variously pointed out that the annular chamber damper consisting of two housing parts comprises a rotor and a pot, wherein the rotor or the pot has at least one damping rib that protrudes into the annular damping chamber space formed by the pot and the rotor. The at least one damping rib forms two annular chamber halves, wherein a throttle connection is provided between the chamber halves. The throttle connection can be provided in that the damping rib itself has a passage with a throttle, or the two annular chamber halves are connected by a line, in which a throttle is used.

According to another feature of the invention, the annular chamber is divided by wall elements into several sub-chambers, where a damping rib protrudes into each sub-chamber. From this, it is clear that each sub-chamber is sub-divided by the damping rib into two chamber halves. With such an embodiment, the damping moment is adjustable; this against the background that not only simple damping of the ring-mount joint is to be allowed, but also that using the damping device the position of the two vehicle units in relation to each other can be controlled.

A sealing device is provided to seal the damping rib of the annular chamber damper, which is arranged on the rotor, against the wall of the pot of the annular chamber damper. The sealing rib, which acts as a piston, comprises a cross-sectionally U-shaped circumferential groove so that the annular chamber of the annular chamber damper, which is formed by the rotor and the pot, is sealed on all three sides against the corresponding walls of the pot. As the rotor is mounted in the pot so it can rotate relative to this, the sealing unit must be constructed as a dynamic seal. To this extent, the damping rib has a circumferential groove, wherein in this groove, there is formed an O-ring, wherein a U-shaped seal rests on the O-ring in the groove. The damping rib is attached to the rotor, for example, by a threaded connection. The O-ring arranged in the groove presses the dynamic seal against the wall of the pot. The three free sides of the damping rib are used to retain the previously mentioned dynamic seal, which is formed accordingly in a U-form, and rests on the O-ring in the previously described groove. That is, the dynamic seal, which may be made, for example, of a highly wear-resistant plastic, such as PP, is pressed by the O-ring—which rests in the groove—against the wall of the enclosure. Also the at least one wall element, by which the annular chamber is divided into several sub-chambers, may have a sealing device, which is designed in the same way as the sealing device of the damping rib.

BRIEF DESCRIPTION OF THE DRAWINGS

With reference to the drawings, the invention will now be explained in closer detail.

FIG. 3a shows the type of sealing of the sealing rib by the damping device against the pot of the annular chamber damper;

FIG. 3b shows a section view of FIG. 3a

DETAILED DESCRIPTION OF THE PREFERRED EMBODIMENTS

Figure 1:
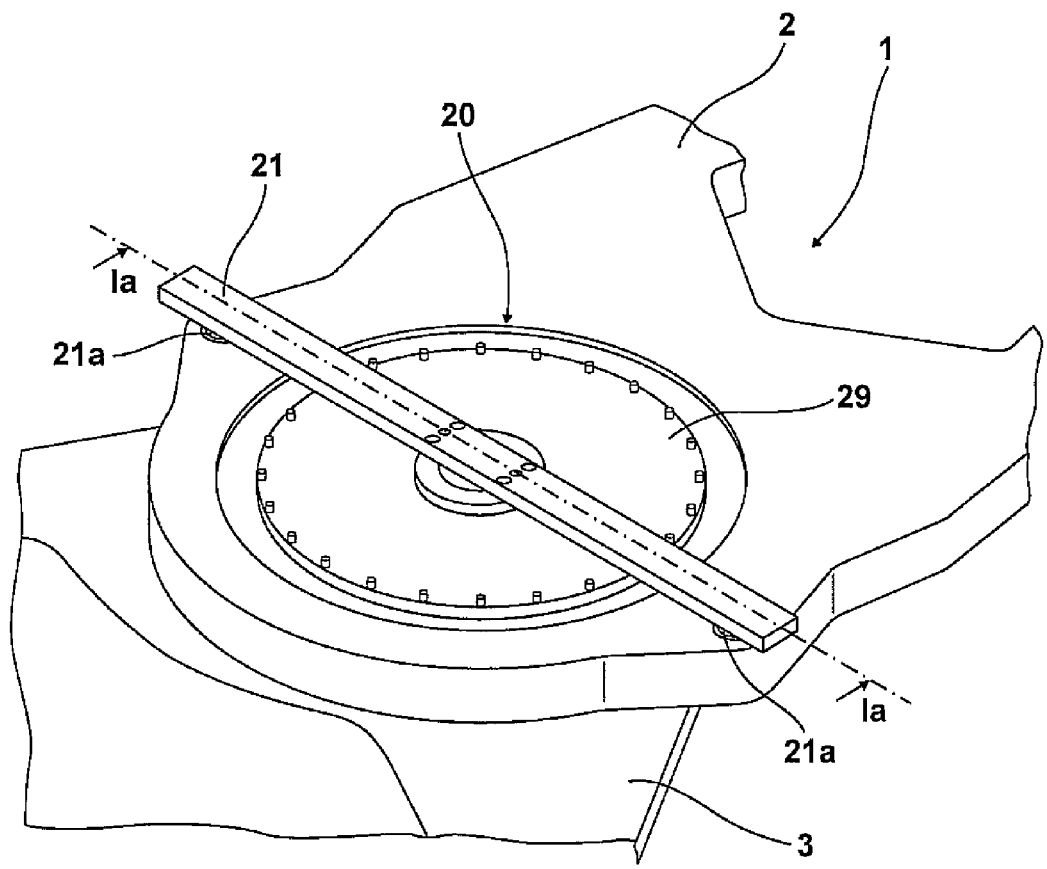
FIG. 1 shows in perspective a view of the novel ring-mount joint.

According to FIG. 1, the ring-mount joint marked as a whole with 1, shows the two cantilevers 2 and 3, by which the ring-mount joint is connected with the respective vehicle unit (not shown). The ring-mount joint marked with 1 is characterized in particular by the fact that each cantilever comprises a slewing ring 4, 5, which represent the mounting ring marked with 6. In the space 7 enclosed by the slewing ring 5, there is located the annular chamber damper marked with 20. The annular chamber damper comprising the pot 22 as a housing part and the rotor 30 as the other housing part, comprises, as is also evident from FIG. 1, a cross-bar 21, whereby the cross-bar 21 is connected, on the one hand, with the annular chamber damper and namely on the rotor, and, on the other hand, with the cantilever 2, which will be addressed later on.

Figure 2:
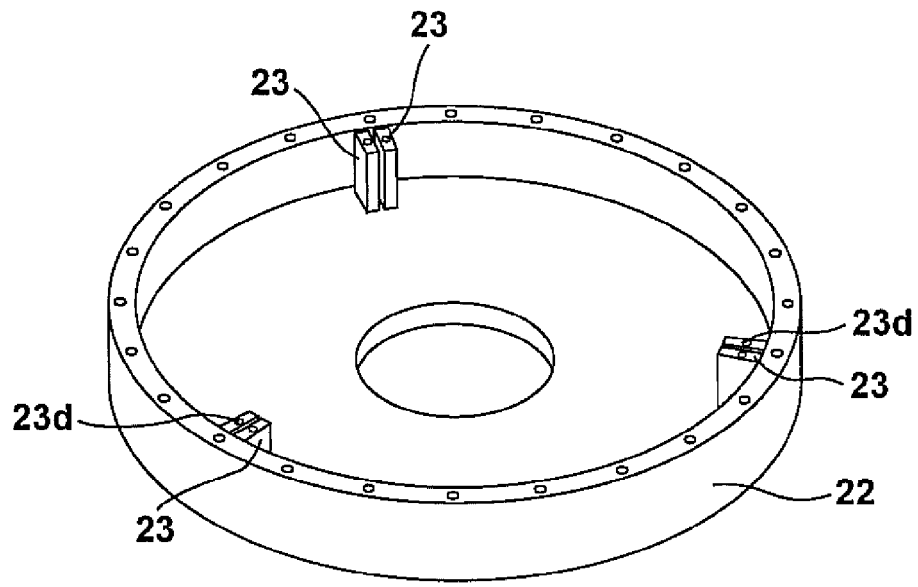
FIG. 2 shows the pot of the annular chamber damper in perspective.

As for the design of the annular chamber damper, reference is being made to FIG. 2 et seq. FIG. 2 shows schematically the pot 22 of the annular chamber damper, wherein the pot 22 of the annular chamber damper comprises three wall elements 23, which are arranged in the pot 22, while being spaced at an angle of 120° from one another. The wall elements are interconnected by fasteners, such as screws, through the holes 23d to the lid 29.

Figure 4:
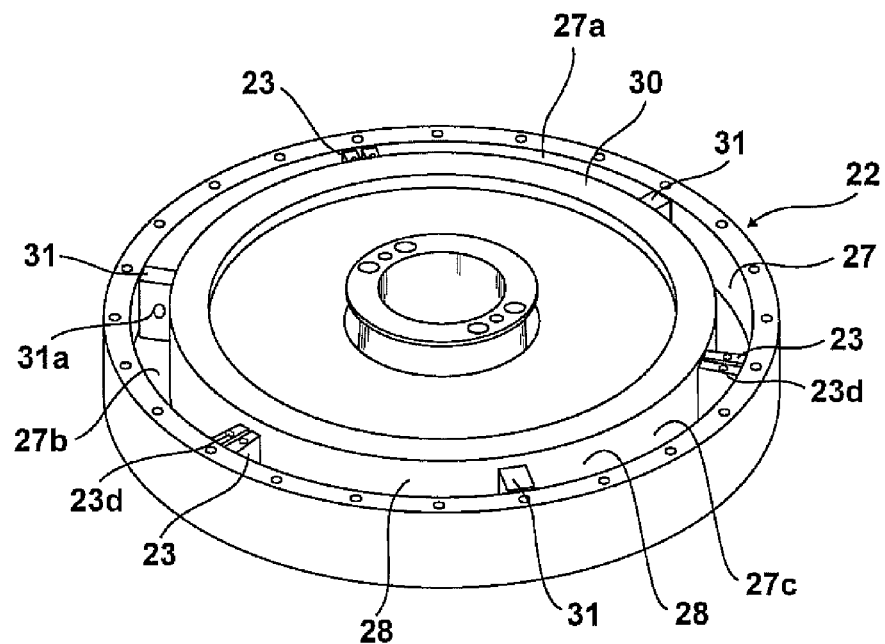
FIG. 4 shows the rotor of the annular chamber damper arranged in the pot, where the lid of the annular chamber damper is omitted.

The pot 22 now retains the rotor marked with 30, with the rotor 30 having on its circumference damping ribs 31. When the rotor 30 is in the pot 22, as shown in FIG. 4, then the annular chamber 27 is divided by the wall elements 23 into three sub-chambers 27a-27c. Each of these sub-chambers 27a-27c contains a damping rib 31, wherein the damping rib 31 divides a sub-chamber into two annular into two annular chamber compartments 28. The damping rib has a throttle 31a for the passage of the damping fluid in the annular chamber. In the illustration according to FIG. 4, there is missing the lid 29, as shown in FIG. 5, to close the annular chamber 27 upwards.

Figure 1A:
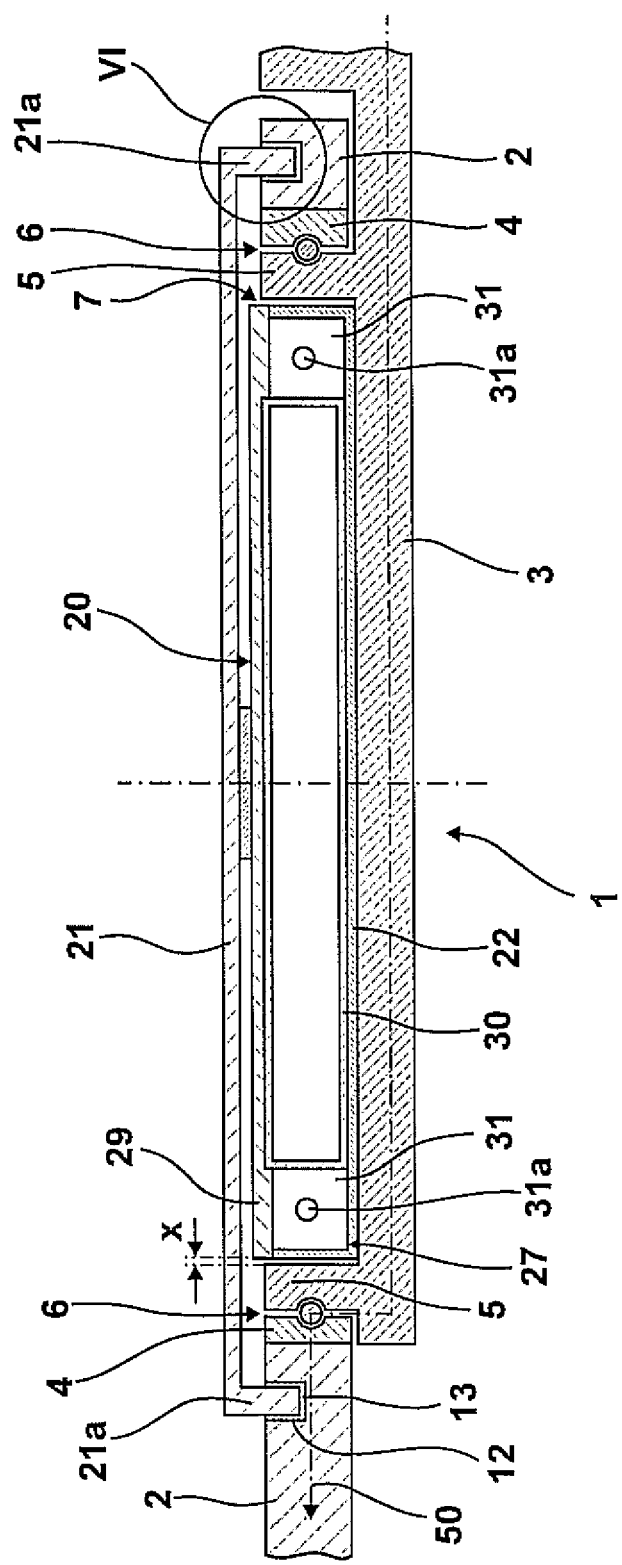
FIG. 1a shows schematically a section along the line 1a of FIG. 1.
Figure 3:
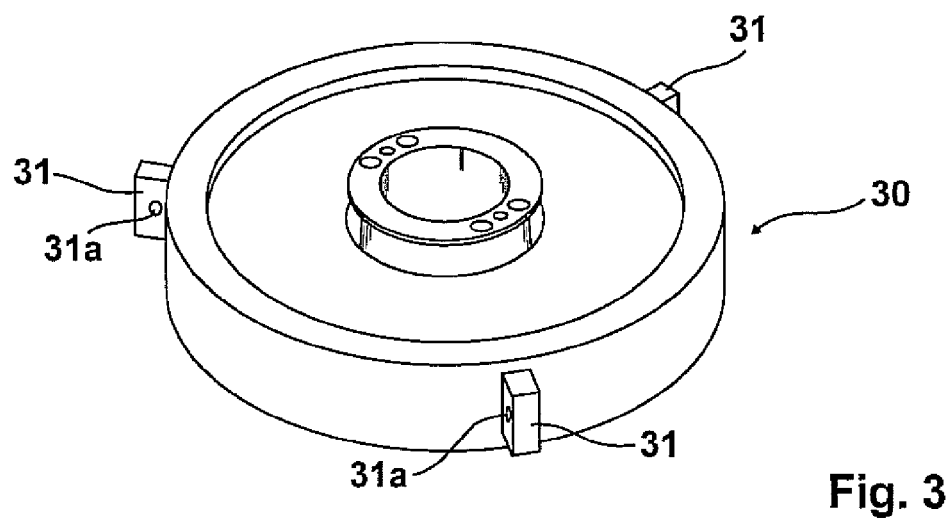
FIG. 3 shows the rotor, also in perspective.
Figure 5:
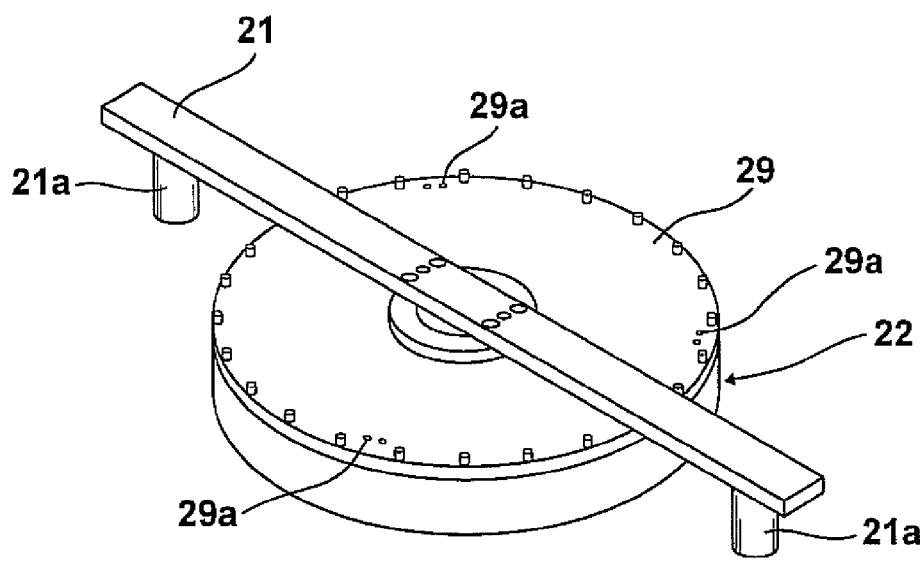
FIG. 5 shows a representation of the annular chamber damper in a state with the lid closed, with the rotor the annular chamber damper comprises the cross-bar for the connection to the second cantilever.
Figure 6:
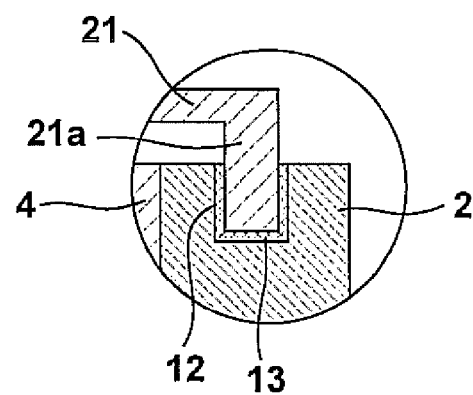
FIG. 6 shows schematically the elastically resilient mounting of the cross-bar in the cantilever.

The rotor 30 shown in FIG. 3 shows a cross-bar 21, as shown in FIG. 5 and also in FIGS. 1 and 1a, where at each end the cross-bar 21 has a stud 21a, with the cross-bar is connected with the cantilever 2 through the studs arranged at one end, as it can be clearly seen from FIG. 1a. The cantilever 2 comprises a socket 12 to accommodate the stud bolt 21a of the cross-bar 21, wherein the socket contains an inner lining 13 made of elastically resilient material, e.g., an elastomer, which envelopes the studs 22.

Figures 3A, 3B:
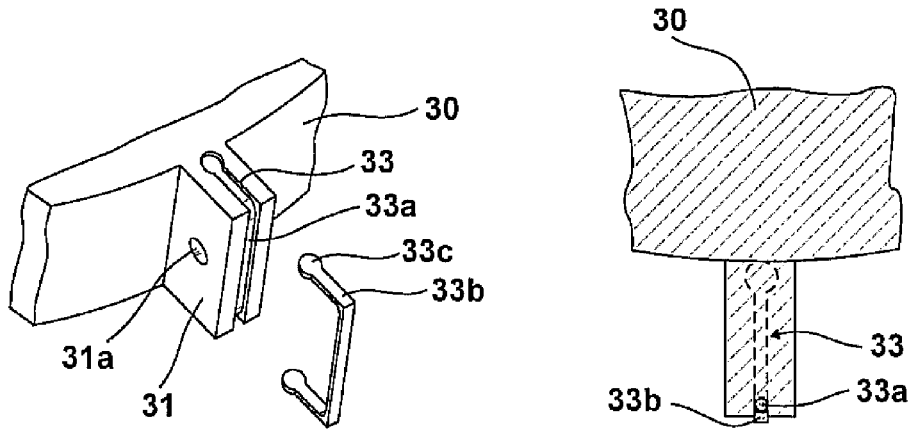
Figure 4A:
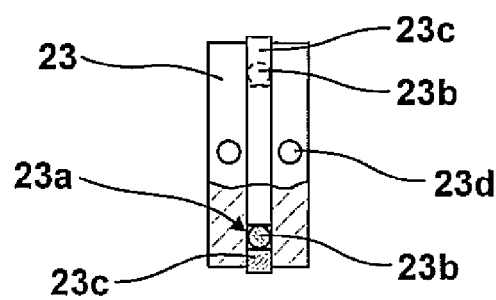
FIG. 4a shows the type of the design of the sealing device of the wall element in the top of the annular chamber damper for subdividing the annular chamber into several sub-chambers.

In the following, we will now consider the sealing of the damping ribs 31 on the one hand, and of the wall elements 23 on the other hand (FIGS. 3a, 3b, 4a). The damping ribs 31, which are arranged on the rotor 30, comprise—as is evident from FIG. 3a—a U-shaped groove 33, whereby the groove 33 retains U-shaped molding part 33a made of elastic material, with the molding part acting as a static seal. A dynamic sealing 33b, which is U-shaped, is applied onto the O-ring. The dynamic seal 33b has at its end at its branches plate-shaped expansions 33c, with which the dynamic seal lies in a corresponding recess on the damping rib. The sealing device of the wall element 23 in the pot 22 of the annular chamber damper is formed much like the damping rib. The wall element 23 has a box-shaped circumferential groove, wherein an O-ring 23b is inlaid in the groove 23a, and the dynamic seal 23c, which is designed equally circumferentially, rests on the O-ring 23b. Each wall element has on its top and bottom holes 23d for the connection to the lid 29, which comprises corresponding apertures 29a shows, as is clearly seen from FIG. 5.

As for the operation of the ring-mount joint with the annular chamber damper, we wish to point out the following:

The annular chamber damper 20 is connected to the cantilever 3 through the pot 22. The rotor 30 is mounted in the pot 22 (FIG. 3). The rotor 30 is in connection with the cross-bar 21 through the cantilever 2. In addition, the cantilever 2 has the slewing ring 5, which is connected with the slewing ring 4 by a ball bearing 6. Both the slewing ring 4 and the slewing ring 5 may be part of the respective cantilever, but they can also be connected with the respective cantilever as separate components, for example, be pressed into the cantilever. Between the pot 22 and the inner slewing ring 5, there is a distance x. With its studs 21a, the cross-bar 21 is elastically mounted a corresponding socket 12, which contains a lining made of a elastomeric soft material. From this, it is clear that the power flow according to arrow 50 (FIG. 1a) does not run through the annular chamber damper 20, but rather through the bearing 6, with the two slewing rings 4, 5 of the cantilever. Due to the circumferential radial distance x between the slewing ring 5 and the outer wall of the pot 22 and the elastic mounting of the cross-bar 21 in the cantilever 2, deformations from any rolling and pitching motions can be accommodated without the annular chamber damper 20 being loaded with any forces or torques in any way.

In addition, the disassembly and assembly of the annular chamber damper 20 is possible without the bearing 6 having to be removed. All it takes is to take off the crossbar 21 in order to take out the rotor from the annular chamber damper 20 after the removal of the cover 29.

The invention claimed is:

1. A ring-mount joint between two vehicle units of an articulated bus, with the joint comprising two cantilevers, wherein each cantilever is arranged on one of the vehicle units, with each cantilever comprising a slewing ring, wherein a first one of the slewing rings of the cantilever is mounted in the other of the two slewing rings so that they can be pivoted, wherein a damping device is provided for damping the rotational motion of the two cantilevers relative to each other, characterized in that in the space enclosed by the inner slewing ring, there is arranged an annular chamber damper, wherein the annular chamber damper comprises two inter-mounted housing parts that are rotatable relative to each other, wherein the one housing part is in connection with the one cantilever and the other housing part is in connection with the other cantilever.

2. The ring-mount joint according to claim 1, characterized in that the one housing part of the annular chamber damper is designed as a pot, which is arranged on a first cantilever, wherein the other housing is designed as a rotor, with the pot receiving the rotor, wherein the rotor is mounted in the pot so that it is rotatable relative to the pot, with the rotor being connected to the other, second cantilever.

3. The ring-mount joint according to claim 1, characterized in that a cross-bar is provided for the connection between the rotor and the other, second cantilever.

4. The ring-mount joint according to claim 1, characterized in that the annular chamber damper is decoupled from the power flow between the two vehicle units by the two cantilevers.

5. The ring-mount joint according to claim 1, characterized in that at least one housing part of the annular chamber damper is mounted elastically yielding relative to the at least one cantilever.

6. The ring-mount joint according to claim 3, characterized in that the cross-bar is mounted, in an elastically yielding manner, in the cantilever and/or the rotor.

7. The ring-mount joint according to claim 3, characterized in that the cross-bar at its end comprises ends studs, wherein at least one of the studs engages with a socket of the cantilever, wherein the socket comprises a lining made of elastically resilient material.

8. The ring-mount joint according to claim 2, characterized in that the rotor or the pot of the housing of the annular chamber damper comprises at least one damping rib, which protrudes into the annular chamber formed by the pot and the rotor.

9. The ring-mount joint according to claim 8, characterized in that the at least one damping rib forms two annular chamber compartments, wherein a throttle connection is formed between the annular chamber compartments.

10. The ring-mount joint according to claim 8, characterized in that the annular chamber is divisible into several sub-chambers by at least one wall element, wherein a damping rib protrudes into every sub-chamber.

11. The ring-mount joint according to claim 10, characterized in that the damping rib is constructed as a piston.

12. The ring-mount joint according to claim 10, characterized in that the damping rib and/or at least one wall element comprise a sealing device to seal the annular chamber.

13. The ring-mount joint according to claim 12, characterized in that the sealing device comprises a static seal, e.g., an O-ring, on which rests a dynamic seal.

14. The ring-mount joint according to claim 12, characterized in that the sealing device is mounted in a groove of the damping rib and/or the wall element.

* * * * *